F. SCHREIDT.
TESTING APPARATUS.
APPLICATION FILED NOV. 20, 1907.
909,950.
Patented Jan. 19, 1909.
3 SHEETS—SHEET 2.
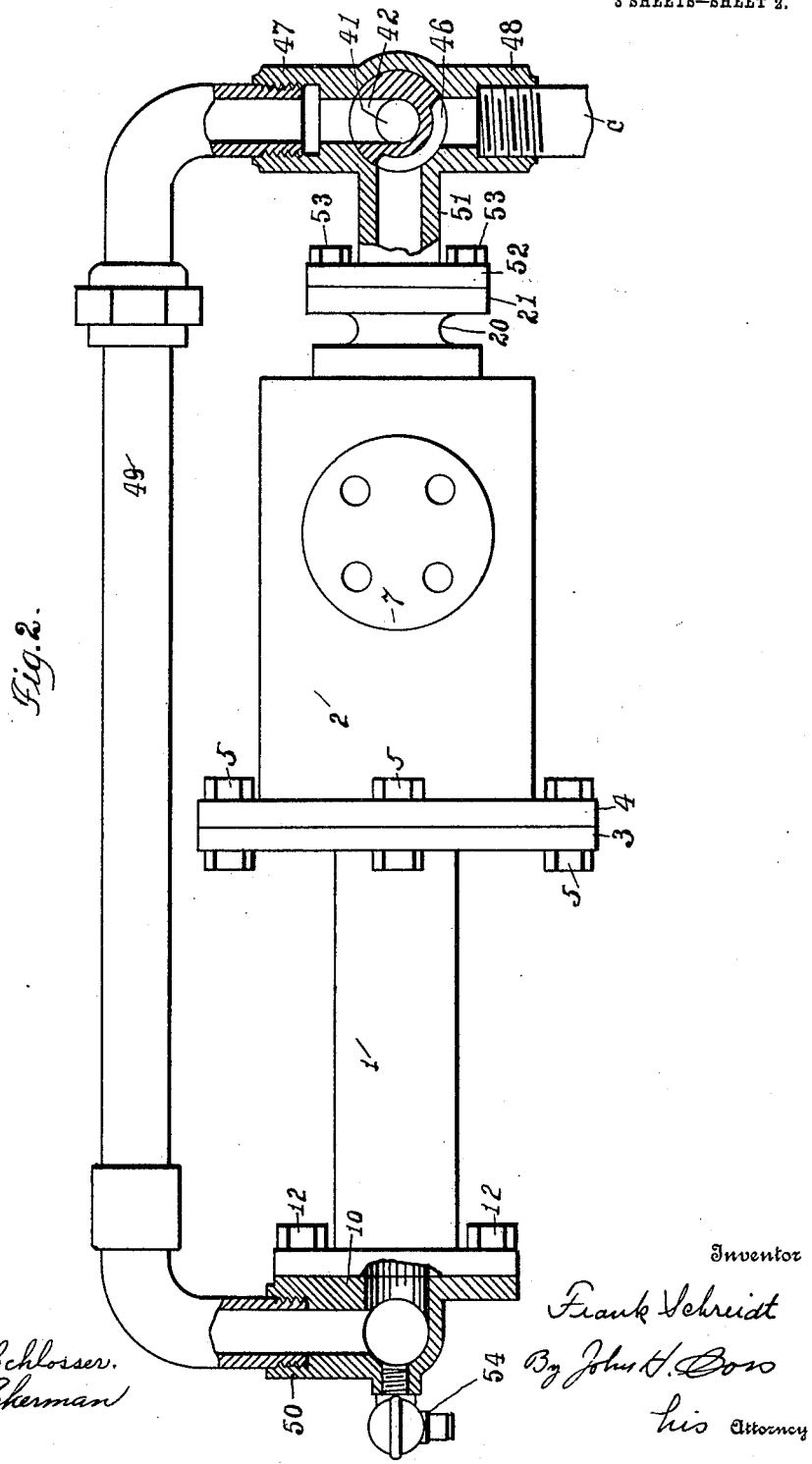

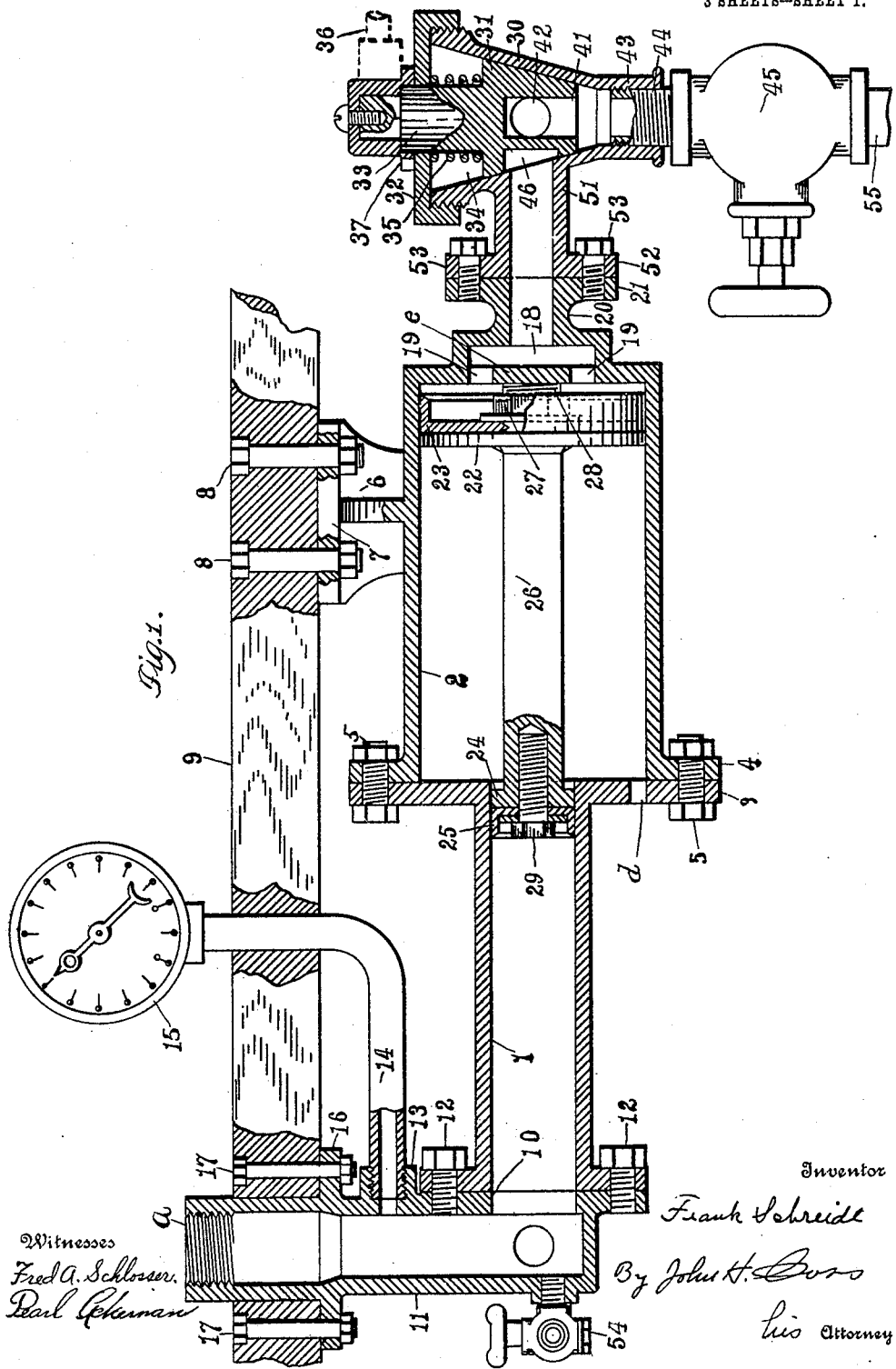

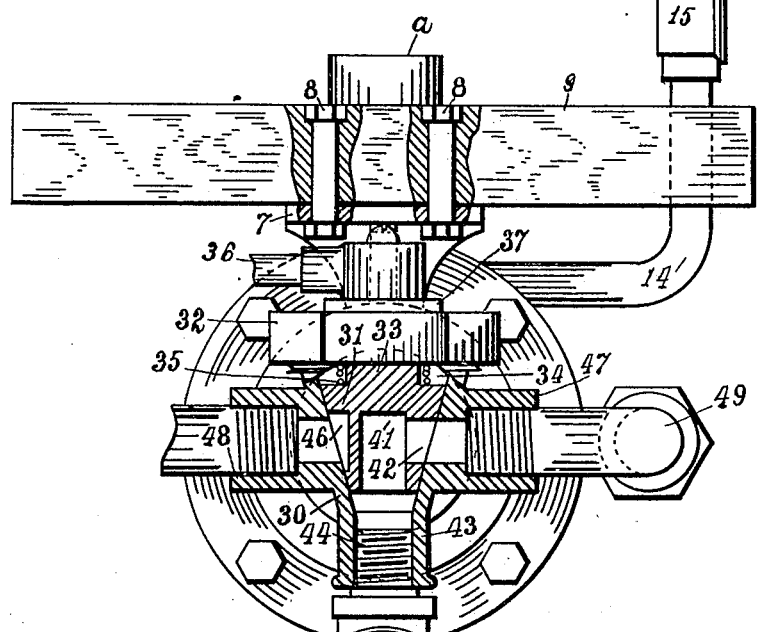

UNITED STATES PATENT OFFICE.

FRANK SCHREIDT, OF MANSFIELD, OHIO.

TESTING APPARATUS.

No. 909,950.   Specification of Letters Patent.   Patented Jan. 19, 1909.

Application filed November 20, 1907. Serial No. 402,943.

*To all whom it may concern:*

Be it known that I, FRANK SCHREIDT, citizen of the United States, residing at Mansfield, in the county of Richland and State of Ohio, have invented certain new and useful Improvements in Testing Apparatus, of which the following is a specification.

My invention relates to a testing apparatus and is designed primarily to test valves but in can be used for testing any other similar device and it consists primarily in the application of a high and low pressure cylinder for testing purposes with means of permitting the inflow of fluid under pressure to the high and low pressure cylinders and of cutting it off from both to increase or decrease the capacity of the testing apparatus and to provide means of testing at a pre-determined pressure.

It consists further in the construction and application of a valve which permits the inflow of fluid from the inlet pipe to pass through a by-pass into the high pressure cylinder and cylinder head thereof and also to cut off the inflow into the by-pass and permit the fluid to flow directly into the low pressure cylinder and against the piston to increase the capacity of the testing apparatus if desired.

A further object of my invention is to provide a testing apparatus that can be regulated to test a valve or other device at a predetermined pressure.

One of the essential features of my invention is to obviate the necessity of using a high pressure boiler or other apparatus for testing purposes by the use of tandem cylinders of different diameters so that the force or pressure of the fluid can be exerted against a piston of larger or smaller area to increase or decrease the capacity for testing purposes of the apparatus at the will of the operator.

It further consists in the construction and arrangement of parts hereinafter described in the specification and pointed out in the claims.

I attain these and other objects by the mechanism illustrated in the accompanying drawings in which—

Figure 1 is a vertical longitudinal section taken through the center of the testing apparatus, also showing a front view of the pressure gage and means of attaching the device to a table or the like. Fig. 2 is a plan view of the testing apparatus showing a part of the valve and cylinder head in central cross section, also view of by-pass showing means of communication of the fluid from the controlling valve to the high pressure cylinder head and cylinder. Fig. 3 is an end view of the testing apparatus and sectional view of the controlling valve with a part broken away, showing the by-pass and inlet and exhaust outlet extending from the valve. Fig. 4 is a plan view of the controlling valve showing the position of the lever in full line with the fluid in communication with the high pressure cylinder and also showing the position of the lever in dotted lines when the fluid is in communication with the low pressure cylinder. Fig. 5 is a plan view partly in section of the controlling valve with the cap removed, the full lines showing the communication of the fluid with the low pressure cylinder and the dotted lines showing the fluid in communication with the by-pass and high pressure cylinder.

Similar letters refer to similar parts throughout the several views.

Referring to the drawings, 1 represents what is designated a high pressure cylinder and 2 a low pressure cylinder. Both of these cylinders are provided with annular outwardly extending flanges 3 and 4 and are connected together with the bore of the cylinders concentric with each other through the medium of bolts 5 or any other well known fastening means. A bracket 6 is made integral or secured to the top of the low pressure cylinder 2 and is provided with a flange 7 having apertures provided therein into which bolts 8 are inserted passing through a table 9 or the like securely suspending the low pressure cylinder to the table as described.

The high pressure cylinder 1 is provided with a cylinder head 10 having an outwardly and upwardly projecting tubular portion 11 which is in communication with the bore of the cylinder 1. The cylinder head 10 is securely attached to the high pressure cylinder through the medium of the bolts 12. The upper portion (*a*) of the tubular portion 11 is provided with internal screwthreads to engage with the threaded portion of a valve or other device that it is desired to test.

A boss 13 is provided having a screw-threaded inner periphery to receive one end of a pipe 14 to the opposite end of which is securely attached a pressure gage 15. A flange 16 is made integral with the tubular portion 11 and is provided with suitable apertures to receive the bolts 17 which pass through the table to securely retain in place the high pressure cylinder (1). The method shown is the preferred manner of attaching the cylinders to a support or the like but it is obvious that other means can be used or the brackets entirely dispensed with if desired.

The low pressure cylinder 2 is provided with a chamber 18 which is in communication with the bore of the cylinder through the medium of the ports 19. The purpose of forming the chamber is to provide a wall (e) to act as a stop or buffer for the piston rod and thereby protect the washer 23. A tubular projecting portion 20 is made integral with the end of the cylinder and is provided with a flange 21. A piston 22 is fitted to the inner periphery of the low pressure cylinder adapted to carry a cupped washer 23. A piston 24 is fitted to the high pressure cylinder to which is attached a cup shaped packing washer 25.

Both of the pistons hereinbefore described are connected or made integral with a piston rod 26. In the construction shown in Fig. 1 it will be noted that the pistons 22 and 24 are made integral with the piston rod 26 and the cup shaped packing washers 23 and 25 are securely attached to the pistons 22 and 24 through the medium of a nut 27 which engages with the threaded exterior of one end 28 of the piston rod 26 and through the medium of the bolt 29 which engages with a screw-threaded aperture formed in the opposite end of the piston rod. This is the preferred construction but it is obvious that the pistons and piston rod can be made separate if desired. To provide means of permitting the fluid to be brought in communication with the high or low pressure cylinder for the purpose intended I have designed a valve of novel construction to be used in conjunction therewith by means of which the inflow of the fluid to the high pressure cylinder can be permitted and prevented from flowing into the low pressure cylinder, or if desired the inflow or communication of the fluid to the low pressure cylinder can be permitted and cut off from the high pressure cylinder. I also provided means on said valve to permit the fluid to be exhausted from the low pressure cylinder when the high pressure cylinder is being filled with fluid.

I will now describe the construction of the valve which controls the communication to the high and low pressure cylinders as described above.

The valve comprises a body or casing 30 provided with a tapered inner periphery to receive and seat a tapered valve 31. The upper portion of the valve body is screw-threaded. A cap 32 is provided having a downwardly depending annular flange interiorly screw-threaded and adapted to engage with the threaded exterior of the valve body. The stem 33 of the valve is reduced in diameter below the largest diameter of the valve 31 forming within the valve casing the space 34. A spiral spring 35 is fitted to the valve stem 33 and interposed between the under surface of the cap 32 and the upper surface of the valve exerting a pressure downwardly against the tapered valve 31 thereby keeping it in close contact with its seat and taking up the ordinary wear of the valve. The upper portion of the valve stem projects above the upper surface of the valve and the free end is formed to receive the end of a lever 36 which is rigidly secured thereto by any well known fastening means. The end of the lever 36 is provided with a flange 37 partially cut away forming stops 38 and 39 which contact with a pin 40 to indicate to the operator that the valve is in full open position and in communication with either the high or low pressure cylinder. The tapered valve 31 is provided with a hollow central portion 41 having an aperture 42 formed in the wall thereof. The lower end of the valve body 43 is internally screw-threaded to receive the nipple 44 which is adapted to engage with and connect to the inner periphery of a regulating valve 45. A segmental groove 46 is formed on the outer periphery of the tapered valve between its extremities to provide means of exhausting the fluid from the low pressure cylinder when desired and its function will be described hereinafter.

Referring to Figs. 2 and 3 it will be observed that the valve body is provided with two outwardly projecting portions 47 and 48 having alined apertures. To the projecting portion 47, a by-pass 49 is connected on one end and the opposite end is connected to a tubular portion 50 formed on the cylinder head 11 as shown.

The valve body 30 is provided with an outwardly projecting portion 51 having a flange 52 formed on its extremity adapted to connect with the tubular projecting portion 21 through the medium of the bolts 53 thereby alining the inner peripheries in the tubular portion 20 and tubular portion 51, with the low pressure cylinder.

A screw-threaded aperture is provided in the lower extremity of the cylinder head 11 to provide means of attaching a relief valve 54 to control the amount of fluid it is desired to permit to escape therefrom to relieve and regulate the pressure more or less when it is desired to test a valve or other apparatus at a predetermined pressure. The valve or other apparatus that it is desired to test is connected to the tubular portion (a) of the cylinder head 11 by any well known means closing the aperture formed in the cylinder head. Reference letter (d) indicates an air vent.

The operation of my testing apparatus is as follows: Fluid under pressure, (preferably water), is admitted through the inlet pipe 55 (under pressure) and passes through the regulating valve 45 into the hollow central portion 41 of the valve 31 and through the aperture 42 into the by-pass 49 thence through the hollow portion of the cylinder head 11 into the high pressure cylinder 1 where it is confined and exerting its pressure against the cup-shaped washer 25 and piston 24 forcing the piston 24 and piston 22 to the position shown in Fig. 1. The pressure of the fluid flowing through the inlet or supply pipe 55 will be indicated by the pressure gage 15 and the same pressure will be exerted against the valve or other apparatus that is being tested. If it is desired to test a valve at a lower pressure than is flowing through the main supply or inlet pipe 55, the valve 54 is gradually opened permitting more or less of the confined fluid to escape therefrom until the desired or pre-determined pressure is indicated by the pressure gage 15.

It will be noted that any desired pressure can be attained for testing purposes by the manipulation of the valves 54 and 45 as described. When it is desired to test a valve or other device at a pressure in excess of the pressure that is flowing through the main pipe 55, the tapered valve 31 is turned to the position shown in Fig. 4 by dotted lines cutting off all communication with the by-pass and high pressure cylinder and cylinder head. The aperture 42 of the valve 31 is then alined with the apertures communicating with the low pressure cylinder (see Fig. 5) permitting the fluid to exert its pressure against the cupped washer 23 and piston 22 fitted to the low pressure cylinder and against the fluid in the high pressure cylinder. The piston 22 and washer 23 as will be apparent is much larger in diameter than the piston 24 and washer 22 of the high pressure cylinder, thus providing a much larger area for the fluid to exert its pressure against. This is for the purpose of increasing the capacity of the testing apparatus and its capacity is increased in proportion to the difference between the area of the high pressure piston and the area of the low pressure piston which as in the testing apparatus shown is preferably made in the ratio of 4 to 1.

Attention is called to the fact that as the piston in the low pressure cylinder is much greater in area than that of the high pressure piston and the fluid exerts its pressure against the piston in the low pressure cylinder it forces the high pressure piston against the fluid confined in the high pressure cylinder and connected apertures thereby increasing the pressure exerted against the valve or other device to be tested in the ratio of the different areas of the pistons the pressure being indicated by the pressure gage.

When the valve that is connected to the testing apparatus is tested and it is desired to replace it by another for testing purposes the valve 54 is opened and the fluid confined in the high pressure cylinder and connected parts is allowed to escape. The piston 22 will then be in contact with the near end of the high pressure cylinder. The tested apparatus is then removed and replaced by another to be tested. The valve 54 is then closed and the lever 36 secured to the valve stem 33 is turned to the position shown in dotted lines in Figs. 1 and 4 when the flow of the fluid from the main pipe 55 is changed from the low pressure cylinder to the by-pass 49 and cylinder head 11 and exerting its pressure against the high pressure piston thus forcing the same to return to the position shown in Fig. 1. The fluid in the low pressure cylinder 2 is permitted to escape by the controlling valve 31 through the segmental groove 46 which is in communication with the aperture in the projecting portion 48 of the valve and thence out through the exhaust pipe c. When the fluid has completely filled the high pressure cylinder and the pressure therein and in the main pipe 55 is equal as indicated by the pressure gage, the lever 36 is turned a quarter turn to the position shown by dotted lines in Fig. 4 when the flow of the fluid will be changed from the by-pass 49 to the low pressure cylinder as hereinbefore described.

Having fully described my invention what I claim and desire to secure by Letters Patent is:

1. In a testing apparatus, two cylinders having their bores arranged concentric with each other, pistons fitted to said cylinders, a hollow head fitted to one of said cylinders, a by-pass, means to admit fluid under pressure to said cylinders to operate said pistons, means to regulate the flow of the fluid in the by-pass to vary the pressure.

2. In a testing apparatus comprising a high and low pressure cylinder secured to each other with the bores concentric with each other, pistons fitted to the bores of said cylinders, a cylinder head secured to one end of the high pressure cylinder having an upwardly extending hollow portion in communication with said cylinder and an opening in the upper extremity, a pressure gage secured to said upwardly extending portion, means to permit an inflow of fluid into the high and low pressure cylinders and to cut off said inflow or communication with either as described and for the purpose set forth.

3. In a testing apparatus comprising a high and low pressure cylinder secured to each other with the bores arranged concentric with each other, a cylinder head attached to the high pressure cylinder having a hollow upwardly extending portion, a valve secured to the lower end of said hollow portion, a pressure gage secured to the hollow portion and in communication therewith, said high and low pressure cylinders secured to a table, a tubular portion made integral with the low pressure cylinder having a chamber formed therein, a controlling valve, a by-pass to connect the controlling valve and cylinder head of the high pressure cylinder substantially as and for the purpose described.

4. In a testing apparatus for testing valves or the like, the combination of two cylinders secured to each other with the bores arranged concentric with each other, a tubular portion provided on one cylinder head a piston rod, pistons of different diameters secured to said poston rod, a valve, a by-pass connected to said valve and to the tubular portion of the cylinder head, means to permit the fluid under pressure to communicate with the hollow portion of the cylinder head and high pressure cylinder whereby the pressure is exerted against the piston in the high pressure cylinder as described and for the purpose set forth.

5. In a testing apparatus, the combination of high and low pressure cylinders of different diameters, connected together with the bores concentric to each other, a piston rod, pistons fitted thereto and adapted to be reciprocated within said cylinders, a cylinder head secured to the high pressure cylinder provided with a hollow portion, said hollow portion having an outwardly extending flange adapted to be secured to a table or the like, a pipe secured to said hollow portion and in communication therewith, a pressure gage secured to the free end of said pipe, a tubular portion formed on the low pressure cylinder, a controlling valve provided with an extending tubular portion adapted to connect with the tubular portion formed on the low pressure cylinder, a by-pass connected to the valve and to the tubular portion of the cylinder head of the high pressure cylinder, a valve adapted to cut off the supply from the inlet pipe, means provided on the controlling valve to permit the fluid to flow into the low pressure cylinder and exert a pressure against the piston fitted to reciprocate therein, substantially, as and for the purpose described.

6. In a testing apparatus for valves and the like, the combination of high and low pressure cylinders of different diameters connected together with the bores arranged concentric with each other, a cylinder head provided with a hollow portion secured to the high pressure cylinder, a valve body secured to the free end of the low pressure cylinder, said valve body having a tapered valve seat within the valve casing, a tapered plug valve fitted thereto, said tapered valve having a hollow central portion with an aperture formed therein to permit the inflow of the fluid to the high and low pressure cylinder as described and for the purpose set forth.

7. In a testing apparatus for testing valves or the like, the combination of a high and a low pressure cylinder, a cylinder head having a hollow portion connected to the high pressure cylinder, said cylinders adapted to be suspended upon a table or the like, a pressure gage secured to the hollow portion of the cylinder head, a valve secured to the low pressure cylinder, a controlling valve, a by-pass connecting the chamber of said valve and the hollow portion of said cylinder head, means provided on said valve to permit the fluid to be brought in communication with the cylinder head and high pressure cylinder, and to permit the fluid pressure to flow into the low pressure cylinder, and also means provided on said valve to permit the fluid to escape from the low pressure cylinder, as described and for the purpose set forth.

8. In a testing apparatus for valves or the like, the combination of high and low pressure cylinders of different diameters connected together, a controlling valve secured to the low pressure cylinder, a by-pass, means provided on said valve to permit the fluid to communicate with the high pressure cylinder or the low pressure cylinder for the purpose of increasing or decreasing the capacity of the testing apparatus, as described and set forth.

9. In a testing apparatus for valves or the like comprising two cylinders of different diameters, a cylinder head secured to the free end of said cylinders having a hollow portion made integral therewith, means to securely suspend said cylinders to the table or the like, a controlling valve secured to the free end of the other cylinder, a by-pass connecting the valve and the hollow portion of the cylinder head, an inlet pipe to provide for the passage of fluid under pressure into the valve secured to the low pressure cylinder, pistons fitted to reciprocate in said cylinders, means provided on the valve to permit fluid to exert pressure against the pistons, means to attach a valve or the like to the hollow portion of the cylinder head for testing purposes, as and for the purpose described.

10. In a testing apparatus for valves or the like, the combination of a high and a low pressure cylinder with the bores arranged concentric with each other and connected to each other, said cylinders having pistons fitted to and adapted to reciprocate therein, a tubular portion having a chamber formed therein provided on the free end of the low pressure cylinder, a controlling valve having a tubular projecting portion formed on the body and a hollow central portion with an aperture therein adapted to communicate with the low pressure cylinder, an inlet pipe connected to the controlling valve, an inlet valve connected to said pipe.

11. In a testing apparatus for valves or the like, the combination of cylinders of different diameters arranged with the bores concentric with each other and connected together, a cylinder head having a hollow portion connected to one of said cylinders and in communication therewith, a valve connected to one end of the other cylinder, means on said valve to permit or prevent the inflow to either of said cylinders as described and for the purpose set forth.

12. In a testing apparatus for valves or the like, comprising a high and low pressure cylinder concentrically connected, a cylinder head with a hollow portion formed integrally therewith, a by-pass, means to permit a fluid pressure to flow through said by-pass to the hollow portion formed on the cylinder head and thence into the high pressure cylinder, an inlet pipe, a valve for controlling said inlet pipe, a relief valve fitted to the lower portion of the cylinder head of the high pressure cylinder whereby the confined fluid can be released more or less at the will of the operator for the purpose of testing valves at a pre-determined pressure.

In testimony whereof I affix my signature in presence of two witnesses.

FRANK SCHREIDT.

Witnesses:
    JOHN H. BOSS,
    PEARL ACKERMAN.